United States Patent
Abraha et al.

(10) Patent No.: US 10,312,972 B2
(45) Date of Patent: Jun. 4, 2019

(54) MULTI-SOURCE SAME-CELL WIRELESS DISTRIBUTION SYSTEM (WDS) WITH DYNAMIC SOURCE ADAPTATION

(71) Applicant: Corning Incorporated, Corning, NY (US)

(72) Inventors: Solomon Tesfay Abraha, Corning, NY (US); Chao He, Allen, TX (US); Anthony Ng'Oma, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/692,815

(22) Filed: Aug. 31, 2017

(65) Prior Publication Data
US 2018/0248590 A1    Aug. 30, 2018

Related U.S. Application Data

(60) Provisional application No. 62/464,744, filed on Feb. 28, 2017.

(51) Int. Cl.
*H04W 72/00* (2009.01)
*H04B 7/024* (2017.01)
*H04W 28/08* (2009.01)
*H04L 1/18* (2006.01)
*H04L 12/803* (2013.01)
(Continued)

(52) U.S. Cl.
CPC ....... *H04B 7/024* (2013.01); *H04B 10/25754* (2013.01); *H04L 1/1812* (2013.01);
(Continued)

(58) Field of Classification Search
CPC .................................................. H04B 7/024
See application file for complete search history.

(56) References Cited

U.S. PATENT DOCUMENTS 7,162,203 B1   1/2007  Brunner
7,961,648 B2   6/2011  Prasad et al.
(Continued)

FOREIGN PATENT DOCUMENTS

KR    2010037378 A    4/2010
WO    2014124432 A1   8/2014
(Continued)

OTHER PUBLICATIONS

H. Zhu, "On frequency reuse in coagerative distributed antenna systems", IEEE Commun. Mag., vol. 50, No. 4, pp. 85-589, 2012.
(Continued)

*Primary Examiner* — Justin Y Lee
(74) *Attorney, Agent, or Firm* — C. Keith Montgomery

(57) ABSTRACT

Embodiments of the disclosure relate to a multi-source same-cell wireless distribution system (WDS) with dynamic source adaptation. In this regard, the WDS includes multiple remote units each configured to distribute a downlink communications signal having identical cell identification in a respective coverage area. The WDS includes a signal distribution circuit communicatively coupled to multiple signal sources. The signal distribution circuit can dynamically determine a selected coverage cell among multiple coverage cells having a client device load higher than a predefined load threshold. Accordingly, the signal distribution circuit can redistribute the defined source capacity of a selected signal source among the multiple signal sources exclusively to the selected coverage cell. By dynamically distributing more capacity to the selected coverage cell with higher client device load, it is possible to increase data throughput, thus helping to provide improved user experience in the selected coverage cell.

23 Claims, 12 Drawing Sheets

(51) Int. Cl.
*H04W 4/33* (2018.01)
*H04B 10/2575* (2013.01)
*H04W 88/06* (2009.01)
*H04W 48/16* (2009.01)
*H04W 88/08* (2009.01)
*H04W 48/20* (2009.01)

(52) U.S. Cl.
CPC ............ *H04L 47/125* (2013.01); *H04W 4/33* (2018.02); *H04W 28/08* (2013.01); *H04W 48/16* (2013.01); *H04W 48/20* (2013.01); *H04W 88/06* (2013.01); *H04W 88/085* (2013.01)

(56) References Cited

U.S. PATENT DOCUMENTS

| | | |
|---|---|---|
| 2011/0135013 A1 | 6/2011 | Wegener |
| 2012/0314665 A1 | 12/2012 | Ishida et al. |
| 2013/0196674 A1* | 8/2013 | Ahmadi ................ H04W 24/02 455/450 |
| 2015/0264582 A1* | 9/2015 | Brighenti .............. H04W 16/08 455/446 |
| 2017/0048732 A1 | 2/2017 | Shekalim |

FOREIGN PATENT DOCUMENTS

| | | |
|---|---|---|
| WO | 2015172812 A1 | 11/2015 |
| WO | 2018160377 A1 | 9/2018 |

OTHER PUBLICATIONS

Y. Wang, W. Feng: Y. Li, S. Zhou. and J. Wang. "Coordinated user scheduling for multi-cell distributed antenna systems," in Proc. IEEE Globecom, pp. 1-5, Dec. 2011.

International Search Report and Written Opinion PCT/US2018/018611 dated May 22, 2018.

\* cited by examiner

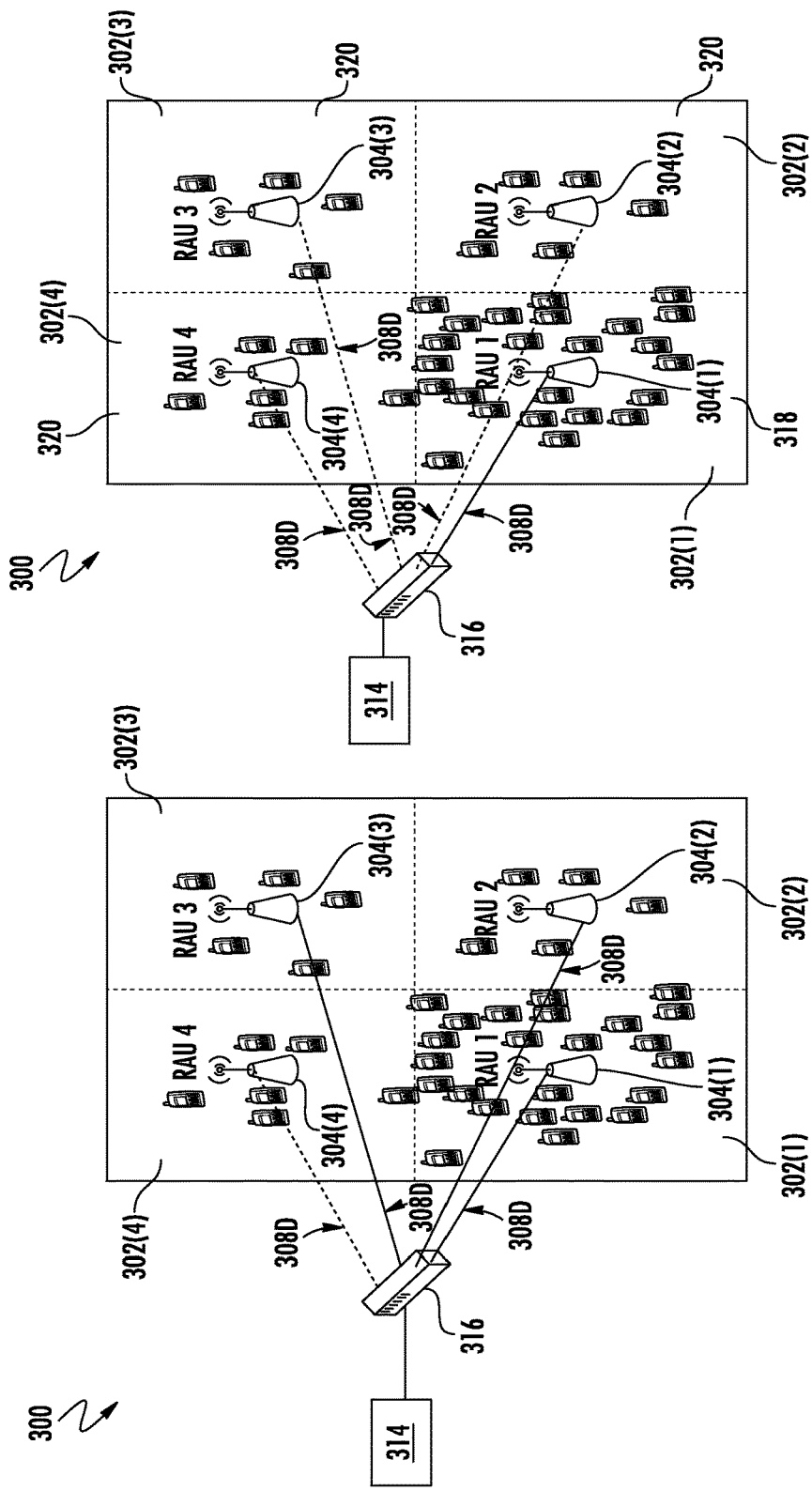

MULTI-SOURCE SAME-CELL WIRELESS DISTRIBUTION SYSTEM (WDS) WITH DYNAMIC SOURCE ADAPTATION

CROSS-REFERENCE TO RELATED APPLICATIONS

This application claims the benefit of priority under 35 U.S.C. § 119(e) of U.S. Provisional Application Ser. No. 62/464,744 filed on Feb. 28, 2017 the content of which is relied upon and incorporated herein by reference in its entirety.

BACKGROUND

The disclosure relates generally to supporting multiple signal sources in a wireless distribution system (WDS), such as a distributed antenna system (DAS), based on identical cell identification.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within an antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates a distribution of communications services to coverage cells 100(1)-100(N) of a WDS provided in the form of a DAS 102, wherein 'N' is the number of coverage cells. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS), signal-based, and others) for location-based services, and combinations thereof, as examples. The coverage cells 100(1)-100(N) may be remotely located. In this regard, the coverage cells 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective coverage cells 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective coverage cells 100(1)-100(N). The remote units 104(1)-104(N) are also configured to receive uplink communications signals 110U from the client devices 116 in the respective coverage cells 100(1)-100(N) to be distributed to the signal source 108. The size of each of the coverage cells 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective coverage cells 100(1)-100(N).

The DAS 102 and the coverage cells 100(1)-100(N) can be configured according to third-generation partnership project (3GPP) coordinated multi-point (CoMP) architecture. More specifically, the DAS 102 and the coverage cells 100(1)-100(N) may be configured according to 3GPP CoMP Scenario 4, in which the coverage cells 100(1)-100(N) each form a respective micro coverage cell. The coverage cells 100(1)-100(N) may be configured to have identical cell identification (cell ID). Furthermore, the remote units 104(1)-104(N) in the coverage cells 100(1)-100(N) may be provided as low-power remote radio heads (RRHs) to distribute the downlink communications signals 110D and/or receive the uplink communications signals 110U using the same RF spectrum (e.g., RF band/channel). In this regard, it may be possible to adapt the DAS 102 to support the next generation (e.g., fifth-generation (5G)) wireless communications systems based on the 3GPP CoMP architecture.

No admission is made that any reference cited herein constitutes prior art. Applicant expressly reserves the right to challenge the accuracy and pertinency of any cited documents.

SUMMARY

Embodiments of the disclosure relate to a multi-source same-cell wireless distribution system (WDS) with dynamic source adaptation. In examples discussed herein, multi-source same-cell refers to supporting multiple signal sources (e.g., base stations), each having a defined source capacity in multiple coverage cells based on identical cell identification. Accordingly, dynamic source adaptation refers to dynamically distributing the defined source capacity of the multiple signal sources to the coverage cells based on client device load. In this regard, the WDS includes multiple remote units each configured to distribute a downlink communications signal having the identical cell identification in a respective coverage area. The WDS includes a signal distribution circuit communicatively coupled to the multiple signal sources. The signal distribution circuit can dynamically determine a selected coverage cell among the multiple coverage cells having a client device load higher than a predefined load threshold. Accordingly, the signal distribution circuit can redistribute the defined source capacity of a selected signal source among the multiple signal sources exclusively to the selected coverage cell. By dynamically distributing more capacity to the selected coverage cell with higher client device load, it is possible to increase data throughput, thus helping to provide improved user experience in the selected coverage cell.

In this regard, in one aspect, a WDS is provided. The WDS includes a plurality of remote units each configured to distribute a downlink communications signal comprising an identical cell identification to one or more client devices in a respective coverage cell among a plurality of coverage cells in the WDS. The WDS also includes a signal distribution circuit communicatively coupled to a plurality of signal sources each having a defined source capacity and configured to distribute the downlink communications signal to the WDS. The signal distribution circuit is configured to receive the downlink communications signal from each of the plurality of signal sources. The signal distribution circuit is also configured to determine a selected coverage cell among the plurality of coverage cells having a client device load higher than a predefined load threshold. The signal distribution circuit is also configured to determine a selected signal source among the plurality of signal sources for providing the respective defined source capacity to the selected coverage cell. The signal distribution circuit is also configured to distribute the downlink communications signal received from the selected signal source exclusively to the selected coverage cell.

In another aspect, a method for supporting multi-source same-cell operation with dynamic source adaptation in a WDS is provided. The method includes providing a plurality of remote units each configured to distribute a downlink communications signal comprising an identical cell identification to one or more client devices in a respective coverage cell among a plurality of coverage cells in the WDS. The method also includes communicatively coupling a signal distribution circuit to a plurality of signal sources each having a defined source capacity and configured to distribute the downlink communications signal to the WDS. The method also includes receiving the downlink communications signal from each of the plurality of signal sources. The method also includes determining a selected coverage cell among the plurality of coverage cells having a client device load higher than a predefined load threshold. The method also includes determining a selected signal source among the plurality of signal sources for providing the respective defined source capacity to the selected coverage cell. The method also includes distributing the downlink communications signal received from the selected signal source exclusively to the selected coverage cell.

In another aspect, a signal distribution circuit is provided. The signal distribution circuit includes a control circuit. The control circuit is configured to receive a downlink communications signal from each of a plurality of signal sources communicatively coupled to the signal distribution circuit. Each of the plurality of signal sources has a defined source capacity and is configured to distribute the downlink communications signal to a WDS. The control circuit is also configured to determine a selected coverage cell among a plurality of coverage cells respectively defined by a plurality of remote units. The selected coverage cell has a client device load higher than a predefined load threshold. The control circuit is also configured to determine a selected signal source among the plurality of signal sources for providing the respective defined source capacity to the selected coverage cell. The signal distribution circuit also includes a signal distributor/combiner circuit configured to distribute the downlink communications signal received from the selected signal source exclusively to the selected coverage cell.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiments, and together with the description serve to explain principles and operation of the various embodiments.

BRIEF DESCRIPTION OF THE DRAWINGS

FIG. 5A is a schematic diagram providing an exemplary illustration of source capacity distribution in the WDS of FIG. 3 prior to dynamic source adaptation;

FIG. 5B is a schematic diagram providing an exemplary illustration of source capacity distribution in the WDS of FIG. 3 after dynamic source adaptation;

DETAILED DESCRIPTION

Embodiments of the disclosure relate to a multi-source same-cell wireless distribution system (WDS) with dynamic source adaptation. In examples discussed herein, multi-source same-cell refers to supporting multiple signal sources (e.g., base stations), each having a defined source capacity in multiple coverage cells based on identical cell identification. Accordingly, dynamic source adaptation refers to dynamically distributing the defined source capacity of the multiple signal sources to the coverage cells based on client device load. In this regard, the WDS includes multiple remote units each configured to distribute a downlink communications signal having the identical cell identification in a respective coverage area. The WDS includes a signal distribution circuit communicatively coupled to the multiple signal sources. The signal distribution circuit can dynamically determine a selected coverage cell among the multiple coverage cells having a client device load higher than a predefined load threshold. Accordingly, the signal distribution circuit can redistribute the defined source capacity of a selected signal source among the multiple signal sources exclusively to the selected coverage cell. By dynamically distributing more capacity to the selected coverage cell with higher client device load, it is possible to increase data throughput, thus helping to provide improved user experience in the selected coverage cell.

Figure 2A:
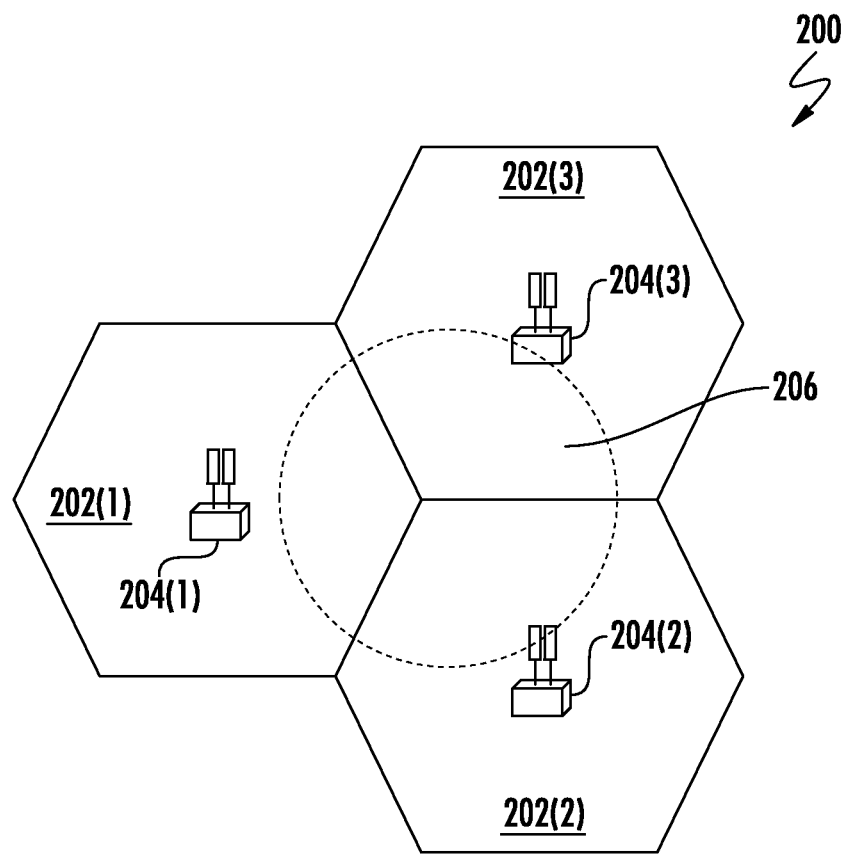
FIG. 2A is a schematic diagram of an exemplary conventional cellular system including a plurality of coverage cells.
Figure 2B:
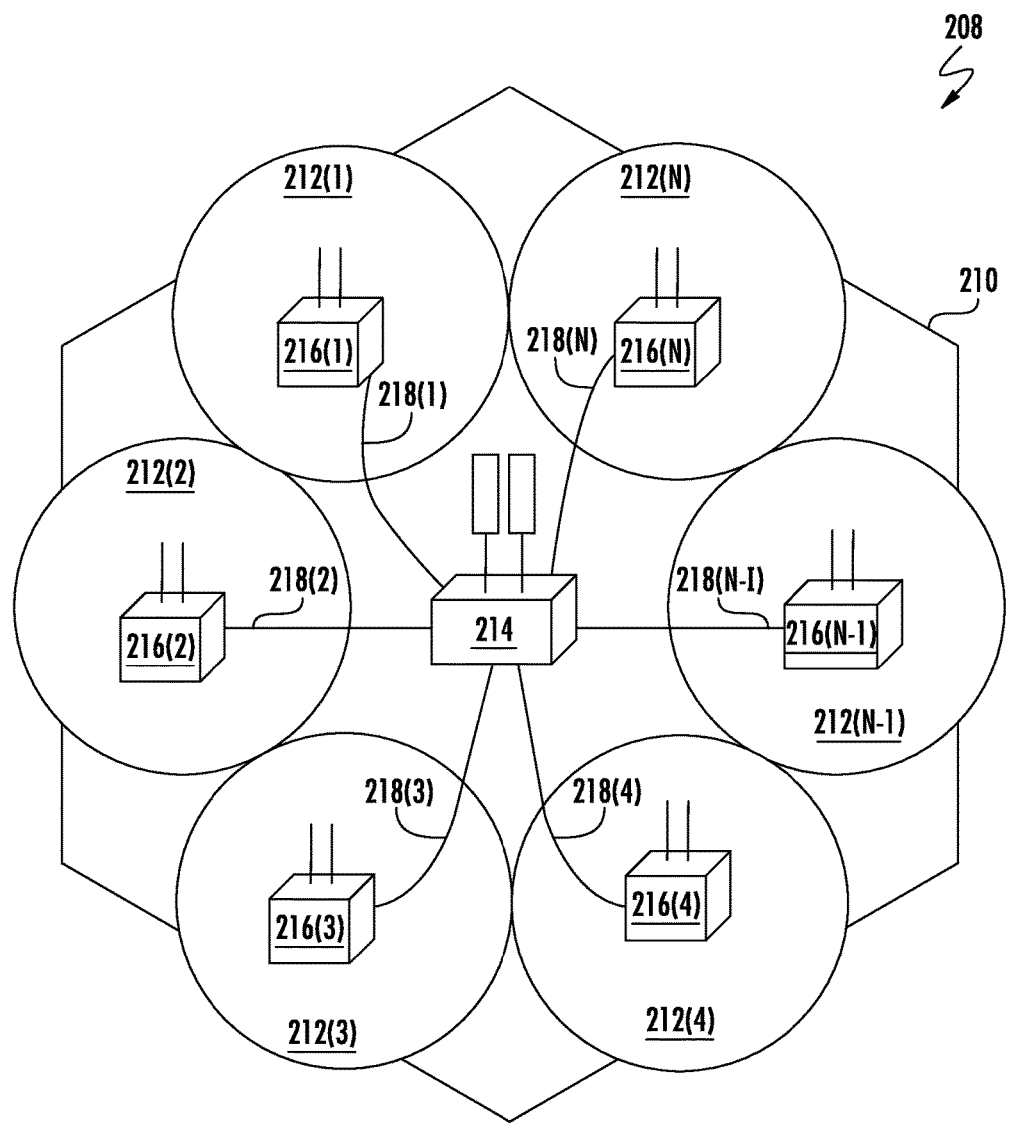
FIG. 2B is a schematic diagram of an exemplary wireless communications system configured according to third-generation partnership project (3GPP) coordinated multi-point (CoMP) (3GPP CoMP) architecture.

Before discussing exemplary aspects of a multi-source same-cell WDS with dynamic capacity distribution, a brief overview of a conventional cellular system and a wireless communications system based on third-generation partnership project (3GPP) coordinated multi-point (CoMP) architecture is first provided with reference to FIGS. 2A and 2B, respectively. The discussion of specific exemplary aspects of a multi-source same-cell WDS with dynamic capacity distribution starts below with reference to FIG. 3.

In this regard, FIG. 2A is a schematic diagram of an exemplary conventional cellular system 200 including a plurality of coverage cells 202(1)-202(3). The conventional cellular system 200 includes a plurality of base stations 204(1)-204(3), which are also referred to as evolved Node-B (eNB) in 3GPP terms, configured to support the coverage cells 202(1)-202(3), respectively. The coverage cells 202(1)-202(3) are associated with distinctive cell identifications (cell IDs). Each of the base stations 204(1)-204(3) has a respective, predefined capacity (e.g., bandwidth and/or throughput). In this regard, the base stations 204(1)-204(3) can also be referred to as capacity sources.

For example, the base stations 204(1)-204(3) may each have a 100 MHz capacity. As such, the conventional cellular system 200 can have a theoretical capacity that equals a sum of the individual capacities of the base stations 204(1)-204(3). However, to achieve the theoretical capacity, the base stations 204(1)-204(3) may be subjected to strict radio frequency (RF) reuse and/or power restrictions to mitigate potential inter-cell RF interferences in a cell border region 206. In other words, the base stations 204(1)-204(3) may be forced to transmit and/or receive RF signals in different RF bands/channels to help reduce potential RF interferences in the cell border region 206. In this regard, the conventional cellular system 200 can achieve a higher overall capacity at the expense of reduced RF spectrum usage and RF spectrum efficiency.

To help overcome the deficiencies of the conventional cellular system 200, 3GPP has defined a new wireless communications system architecture known as the 3GPP CoMP architecture. In this regard, FIG. 2B is a schematic diagram of an exemplary wireless communications system 208 configured according to the 3GPP CoMP architecture. The wireless communications system 208 includes a macro coverage cell 210 and a plurality of micro coverage cells 212(1)-212(N).

The wireless communications system 208 includes a base station 214 (e.g., eNB) configured to support the macro coverage cell 210. The wireless communications system 208 also includes a plurality of remote units 216(1)-216(N) (e.g., low-power RRHs) configured to support the micro coverage cells 212(1)-216(N), respectively. The remote units 216(1)-216(N) are coupled to the base station 214 via a plurality of optical fiber-based links 218(1)-218(N). Accordingly, the base station 214 may communicate downlink and uplink signals with the remote units 216(1)-216(N) with minimal propagation delay.

In contrast to the conventional cellular system 200 in which the coverage cells 202(1)-202(3) are associated with distinctive cell IDs, the macro coverage cell 210 and the micro coverage cells 212(1)-212(N) are associated with an identical cell ID. In this regard, the wireless communications system 208 configured according to the 3GPP CoMP architecture can also be referred to as a "same-cell" wireless communications system.

By associating the macro coverage cell 210 and the micro coverage cells 212(1)-216(N) with the identical cell ID, the base station 214 and the remote units 216(1)-216(N) can be coordinated to transmit control signals, such as channel-specific reference signals (CRS), with a reduced number of radio resource blocks (RBs). As a result, more radio RBs may be allocated to convey data, thus helping to improve overall system capacity in the macro coverage cell 210 and the micro coverage cells 212(1)-212(N). Further, by associating the macro coverage cell 210 and the micro coverage cells 212(1)-212(N) with the identical cell ID, it may also possible to reduce the number of handovers between the macro coverage cell 210 and the micro coverage cells 212(1)-212(N), thus helping to reduce handover overheads.

To help improve RF spectrum efficiency over the conventional cellular system 200, the base station 214 and the remote units 216(1)-216(N) are configured to transmit downlink signals in the same RF bands/channels simultaneously. In this regard, a client device located in the macro coverage cell 210 and/or the micro coverage cells 212(1)-212(N) can simultaneously receive multiple copies of the downlink signal from the base station 214 and/or the remote units 216(1)-216(N). The client device may be configured to coherently combine the multiple copies of the downlink signal to achieve a potentially higher signal-to-noise ratio (SNR). In essence, the client device utilizes coherent combining techniques to turn inter-cell RF interferences into benefits. As a result, the wireless communications system 208 may achieve one-hundred percent (100%) RF spectrum reuse between the macro coverage cell 210 and the micro coverage cells 212(1)-212(N), thus helping to improve the RF spectrum efficiency over the conventional cellular system 200.

Notably, the downlink and uplink signals communicated in the wireless communications system 208 are provided via the base station 214. In this regard, the overall capacity of the wireless communications system 208 is limited to the capacity of the base station 214. Thus, it may be desired to add additional base stations as additional capacity sources to help increase the overall capacity of the wireless communications system 208.

Further, when the wireless communications system 208 is deployed in an indoor environment as a WDS, the client devices to be served by the wireless communications system 208 may distributed non-uniformly across the micro coverage cells 212(1)-212(N). For example, client device density can be higher in conference rooms and hallways than in cubicles and offices. Moreover, as client devices move around, user load in the micro coverage cells 212(1)-212(N) can change dynamically. Accordingly, it may also be desired to dynamically adapt the capacities in the micro coverage cells 212(1)-212(N) based on user load.

Figure 3:
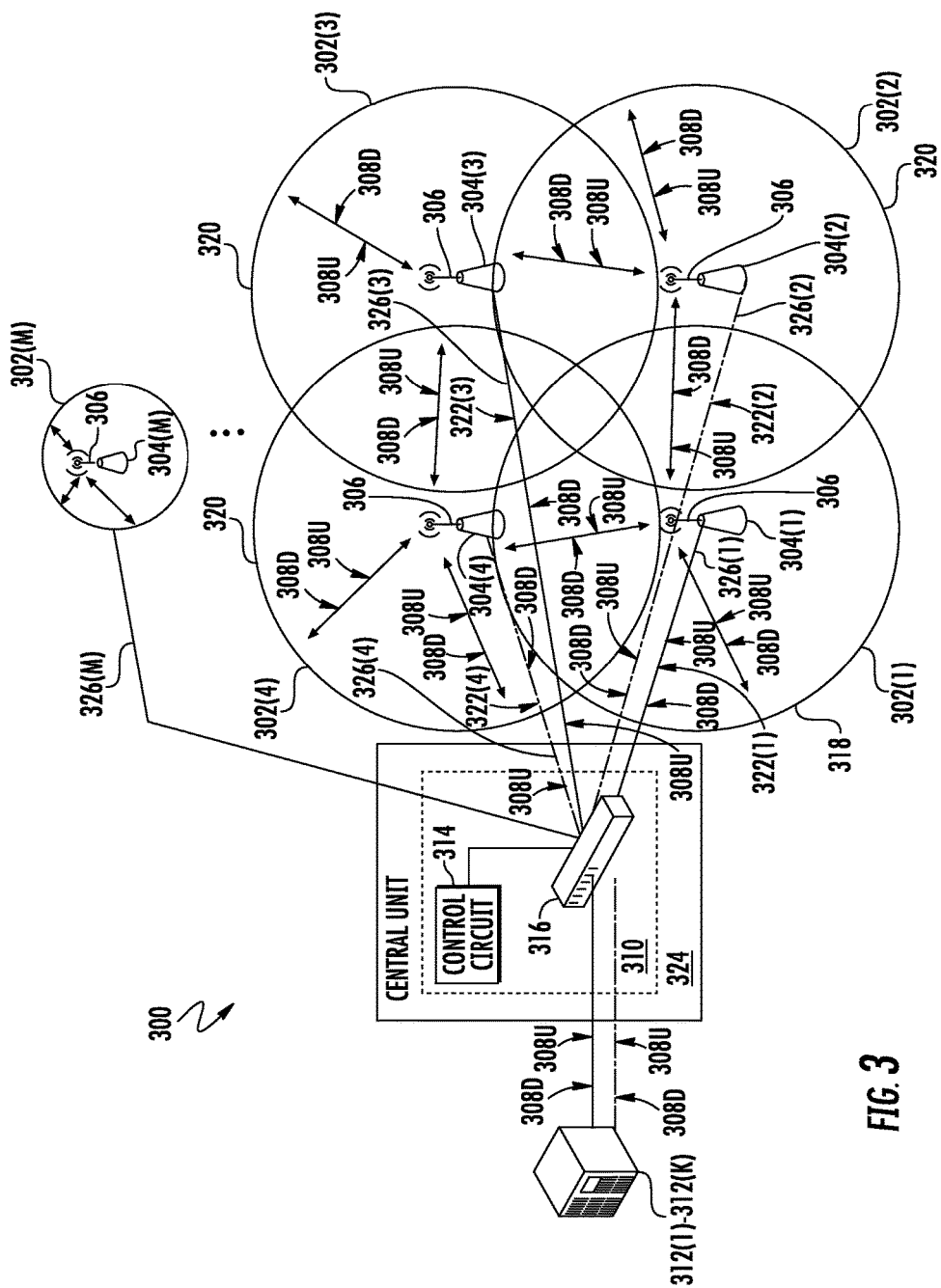
FIG. 3 is a schematic diagram of an exemplary WDS configured to support multiple signal sources (multi-source) based on an identical cell ID (same-cell) and provide dynamic source adaptation among a plurality of coverage cells based on client device loads in the plurality of coverage cells.

In this regard, FIG. 3 is a schematic diagram of an exemplary WDS 300 configured to support multiple signal sources (multi-source) based on an identical cell ID (same-cell) and provide dynamic capacity distribution among a plurality of coverage cells 302(1)-302(M) based on client device loads in the coverage cells 302(1)-302(M). Accordingly, the WDS 300 may also be referred to as a multi-source same-cell WDS. The WDS 300 includes a plurality of remote units 304(1)-304(M) that defines the coverage boundaries of the coverage cells 302(1)-302(M), respectively.

The WDS 300 is adapted from the 3GPP CoMP architecture as discussed earlier in reference to FIG. 2B. The WDS 300 is similar to the wireless communications system 208 of FIG. 2B in that the coverage cells 302(1)-302(M) are associated with the identical cell ID, and the remote units 304(1)-304(M) are configured to communicate downlink/uplink signals simultaneously in same RF band/channel. In this regard, the WDS 300 may achieve higher RF spectrum efficiency via 100% RF spectrum reuse. Similar to the client devices in the wireless communications system 208, a client device in the WDS 300 may simultaneously receive multiple copies of a downlink communications signal from one or more of the remote units 304(1)-304(M) and perform coherent signal combining to improve SNR. In this regard, the WDS 300 inherits many of the benefits of the wireless communications system 208 configured according to the 3GPP CoMP architecture.

The WDS 300 is also noticeably different from the wireless communications system 208 in at least three aspects. First, the WDS 300 does not include the macro coverage cell 210 as in the wireless communications system 208 of FIG. 2B. Second, the WDS 300 can support multiple signal sources (e.g., base stations, eNBs, etc.). Third, the WDS 300 can provide dynamic capacity distribution based on client device loads in the coverage cells 302(1)-302(M). By configuring the WDS 300 to support multiple signal sources, the WDS 300 can provide a higher overall system capacity than the wireless communications system 208 of FIG. 2B. Further, by supporting dynamic capacity distribution based on client device loads in the coverage cells 302(1)-302(M), it may be possible to increase capacity in remote unit cells with higher client device load, thus helping to achieve increased data throughput and improved user experiences.

For the convenience of illustration and reference, the coverage cells 302(1)-302(4) and the remote units 304(1)-304(4) are discussed hereinafter as non-limiting examples. It should be appreciated that the configuration and operation principles discussed herein are applicable to all of the coverage cells 302(1)-302(M) and all of the remote units 304(1)-304(M) in the WDS 300. In a non-limiting example, the coverage cells 302(1)-302(4) are neighboring coverage cells that overlap at least partially with each other.

With reference to FIG. 3, the remote units 304(1)-304(4) each include at least one antenna 306 (e.g., omnidirectional antenna, directional antenna, etc.) for distributing a downlink communications signal 308D to one or more client devices in a respective coverage cell among the coverage cells 302(1)-302(4). In a non-limiting example, the downlink communications signal 308D is distributed from each of the remote units 304(1)-304(4) with the identical cell ID and in an identical downlink RF spectrum (e.g., RF band/channel). As a result, the client devices may each receive multiple copies of the downlink communications signal 308D and perform coherent combining to boost SNR.

The WDS 300 includes a signal distribution circuit 310 that is communicatively coupled to a plurality of signal sources 312(1)-312(K). In a non-limiting example, the signal sources 312(1)-312(K) include base stations, eNBs, digital baseband units (DBUs), or a combination therein. Each of the signal sources 312(1)-312(K) has a defined source capacity (e.g., bandwidth, throughput, etc.) and thus can be referred to as a capacity source. Given that the WDS 300 may be configured to support 100% RF spectrum reuse, the WDS 300 may have an overall capacity that approximately equals a sum of the defined capacity of the signal sources 312(1)-312(K). Each of the signal sources 312(1)-312(K) is configured to distribute the downlink communications signal 308D to the signal distribution circuit 310 in the WDS 300.

The signal distribution circuit 310 includes a control circuit 314 and a signal distributor/combiner circuit 316. In a non-limiting example, the control circuit 314 can be a microprocessor, a microcontroller, a field programmable gate array (FPGA), and so on. The control circuit 314 is configured to receive the downlink communications signal 308D from each of the signal sources 312(1)-312(K). The control circuit 314 is also configured to determine a selected coverage cell 318, such as the coverage cell 302(1) among the coverage cells 302(1)-302(4), that has a client device load higher than a predefined load threshold. In this regard, to help improve user experience in the selected coverage cell 318, it may be desired to provide more capacity to the remote unit 304(1) that distributes the downlink communications signal 308D in the selected coverage cell 318. Accordingly, the control circuit 314 determines a selected signal source among the signal sources 312(1)-312(K) for providing the respective defined capacity to the selected coverage cell 318. The signal distributor/combiner circuit 316 then distributes the downlink communications signal 308D received from the selected signal source exclusively to the selected coverage cell 318. By doing so, the control circuit 314 provides the defined capacity of the selected signal source exclusively to the selected coverage cell 318. As a result, it may be possible to boost data throughput in the selected coverage cell 318, thus helping to provide improved user experience in the selected coverage cell 318.

The control circuit 314 may be configured to determine the selected coverage cell 318 and distribute the defined capacity from the selected signal source to the selected coverage cell 318 according to a process. In this regard, FIG. 4 is a flowchart of an exemplary process 400 that can be employed by the signal distribution circuit 310 of FIG. 3 for supporting multi-source same-cell operation with dynamic source adaptation in the WDS 300.

Figure 4:
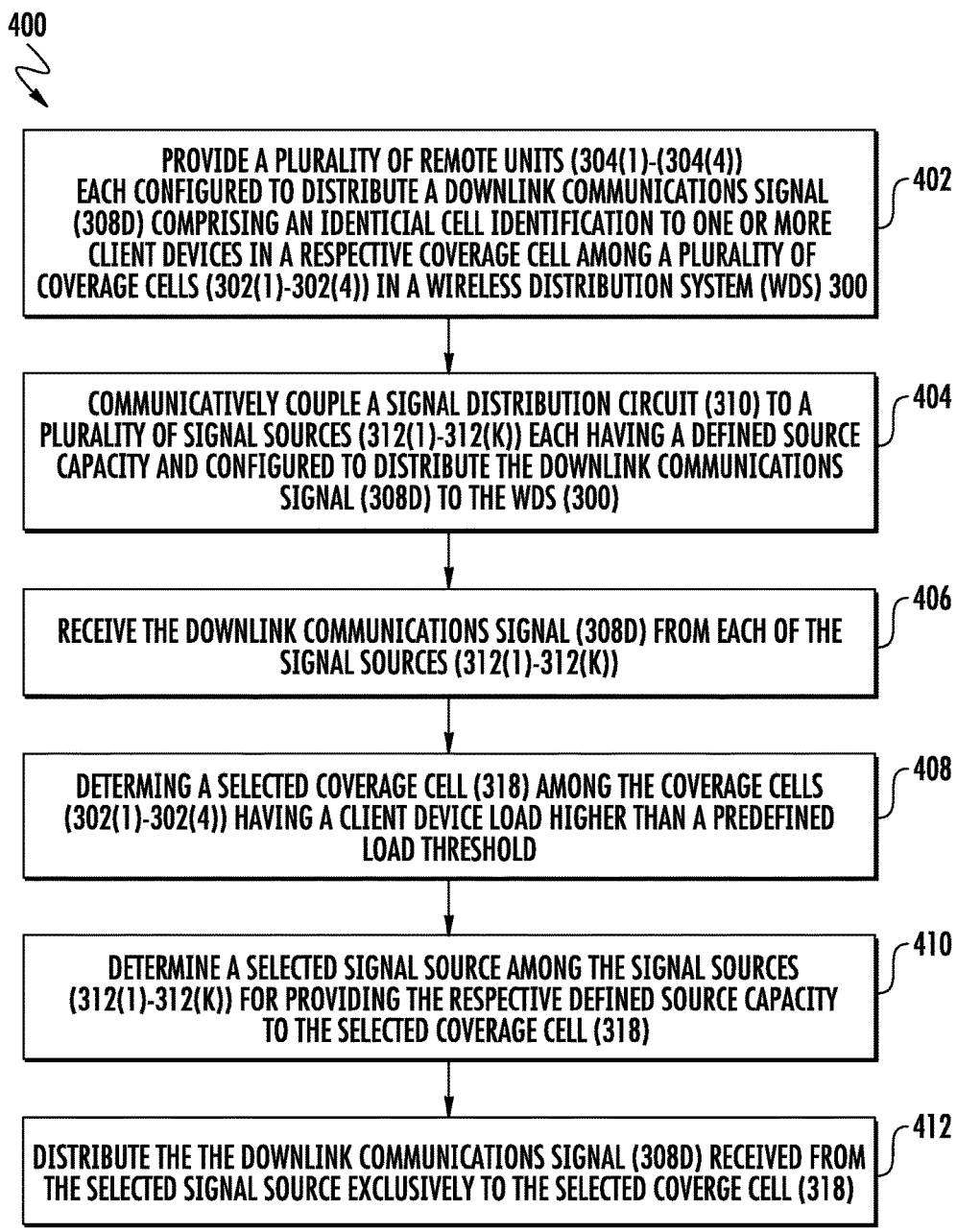
FIG. 4 is a flowchart of an exemplary process that can be employed by a signal distribution circuit in the WDS of FIG. 3 for supporting multi-source same-cell operation with dynamic source adaptation in the WDS.

With reference to FIG. 4, the remote units 304(1)-304(4) are provided in the WDS 300 (block 402). Each of the remote units 304(1)-304(4) is configured to distribute the downlink communications signal 308D having the identical cell ID to the client devices in the respective coverage cell among the coverage cells 302(1)-302(4). The signal distribution circuit 310 in the WDS 300 is communicatively coupled to the signal sources 312(1)-312(K) (block 404). Each of the signal sources 312(1)-312(K) has the defined source capacity and is configured to distribute the downlink communications signal 308D to the WDS 300. The control circuit 314 in the signal distribution circuit 310 is configured to receive the downlink communications signal 308D from each of the signal sources 312(1)-312(K) (block 406). The control circuit 314 is also configured to determine the selected coverage cell 318 among the coverage cells 302(1)-302(4) that has the client device load higher than the predefined load threshold (block 408). The control circuit 314 is further configured to determine the selected signal source among the signal sources 312(1)-312(K) for providing the respective defined source capacity to the selected coverage cell 318 (block 410). The signal distributor/combiner circuit 316 in the signal distribution circuit 310 is configured to distribute the downlink communications signal 308D received from the selected signal source exclusively to the selected coverage cell 318 (block 412).

With reference back to FIG. 3, the control circuit 314 can also be configured to determine one or more second selected coverage cells 320 among the coverage cells 302(1)-302(4) having the client device load lower than the predefined load threshold. The control circuit 314 is further configured to determine a second selected signal source among the signal sources 312(1)-312(K) for sharing the respective defined source capacity between the second selected coverage cells 320. Accordingly, the signal distributor/combiner circuit 316 distributes the downlink communications signal 308D received from the second selected signal source to the second selected coverage cells 320. As shown in FIG. 3, the second selected coverage cells 320 include three coverage cells 302(2)-302(4). In this regard, each of the second selected coverage cells 320 may receive up to one-third of the defined source capacity of the second selected signal sources.

In one non-limiting example, the defined source capacity can be identical for each of the signal sources 312(1)-312(K). Accordingly, the defined source capacity of the selected signal source equals the defined source capacity of the second selected signal source. In another non-limiting example, the defined source capacity can be different between the signal sources 312(1)-312(K). In this regard, the control circuit 314 may determine the selected signal source and the second selected signal source by comparing the client device load in the selected coverage cell 318 and the client device load in the second selected coverage cells 320. For example, if the client device load in the selected coverage cell 318 is higher than the combined client device load in the second selected coverage cells 320, the defined source capacity of the selected signal source would be higher than the defined source capacity of the second selected signal source. In contrast, if the client device load in the selected coverage cell 318 is lower than the combined client device load in the second selected coverage cells 320, the defined source capacity of the selected signal source would be lower than the defined source capacity of the second selected signal source.

The control circuit 314 may determine the client device load in each of the coverage cells 302(1)-302(4) based on a plurality of client device load reports 322(1)-322(4) provided by the remote units 304(1)-304(4), respectively. Each of the remote units 304(1)-304(4) may be configured to determine a respective client device load based on a variety of techniques and/or algorithms. The remote units 304(1)-304(4) may be configured to provide the client device load reports 322(1)-322(4) periodically or on demand.

Each of the remote units 304(1)-304(4) is also configured to receive an uplink communications signal 308U from the client devices in an identical uplink RF spectrum, and provide the received uplink communications signal 308U to the signal distributor/combiner circuit 316 in the signal distribution circuit 310. In this regard, the signal distributor/combiner circuit 316 may receive the uplink communications signal 308U from the selected coverage cell 318 and provide the received uplink communications signal 308U exclusively to the selected signal source among the signal sources 312(1)-312(K). The signal distributor/combiner circuit 316 may also receive the uplink communications signal 308U from the second selected coverage cells 320 and provide the received uplink communications signal 308U to the second selected signal source among the signal sources 312(1)-312(K).

The WDS 300 also includes a central unit 324 that is coupled to the remote units 304(1)-304(4) via a plurality of communications mediums 326(1)-326(4), which may be optical fiber-based communications mediums. In a non-limiting example, the signal distribution circuit 310 can be provided in (e.g., integrated into or collocated with) the central unit 324.

To further illustrate how the WDS 300 is configured to support dynamic source adaptation, FIGS. 5A and 5B are discussed next. Common elements between FIGS. 3, 5A, and 5B are shown therein with common element numbers and will not be re-described herein.

FIG. 5A is a schematic diagram providing an exemplary illustration of source capacity distribution in the WDS 300 of FIG. 3 prior to dynamic source adaptation. As shown in FIG. 5A, client device load is higher in the coverage cell 302(1) than in the coverage cells 302(2)-302(4). However, as indicated by the solid lines of the downlink communications signal 308D, the coverage cell 302(1) shares the defined source capacity of a signal source with the coverage cells 302(2), 302(3). In this regard, the coverage cell 302(1) only receives up to one-third the defined source capacity of the signal source. Consequently, the client devices in the coverage cell 302(1) may suffer suboptimal performance due to insufficient capacity in the coverage cell 302(1). In the meantime, the coverage cell 302(4) receives 100% of the defined source capacity of another signal source. With less client devices located in the coverage cell 302(4), the coverage cell 302(4) may have redundant capacity that is underutilized. In this regard, it may be desired to redistribute the redundant capacity from the coverage cell 302(4) to the coverage cell 302(1) via dynamic source adaptation.

FIG. 5B is a schematic diagram providing an exemplary illustration of source capacity distribution in the WDS 300 of FIG. 3 after dynamic source adaptation. The control circuit 314 determines that the coverage cell 302(1) has the client device load higher than the predefined load threshold. Thus, according to previous discussions in FIG. 3, the coverage cell 302(1) becomes the selected coverage cell 318 and would receive the defined source capacity from the selected signal source exclusively. Since the client device loads in the coverage cells 302(2)-302(4) are all lower than the predefined load threshold, the coverage cells 302(2)-302(4) become the second selected coverage cells 320. Consequently, the second selected coverage cells 320 share the defined source capacity of the second selected signal source (as indicated by the dotted lines of the downlink communications signal 308D). By redistributing the redundant capacity from the coverage cell 302(4) to the coverage cell 302(1) via dynamic source adaptation, it is possible to provide more capacity to the coverage cell 302(1), thus helping to improve data throughput and user experience in the coverage cell 302(1).

Figure 1:
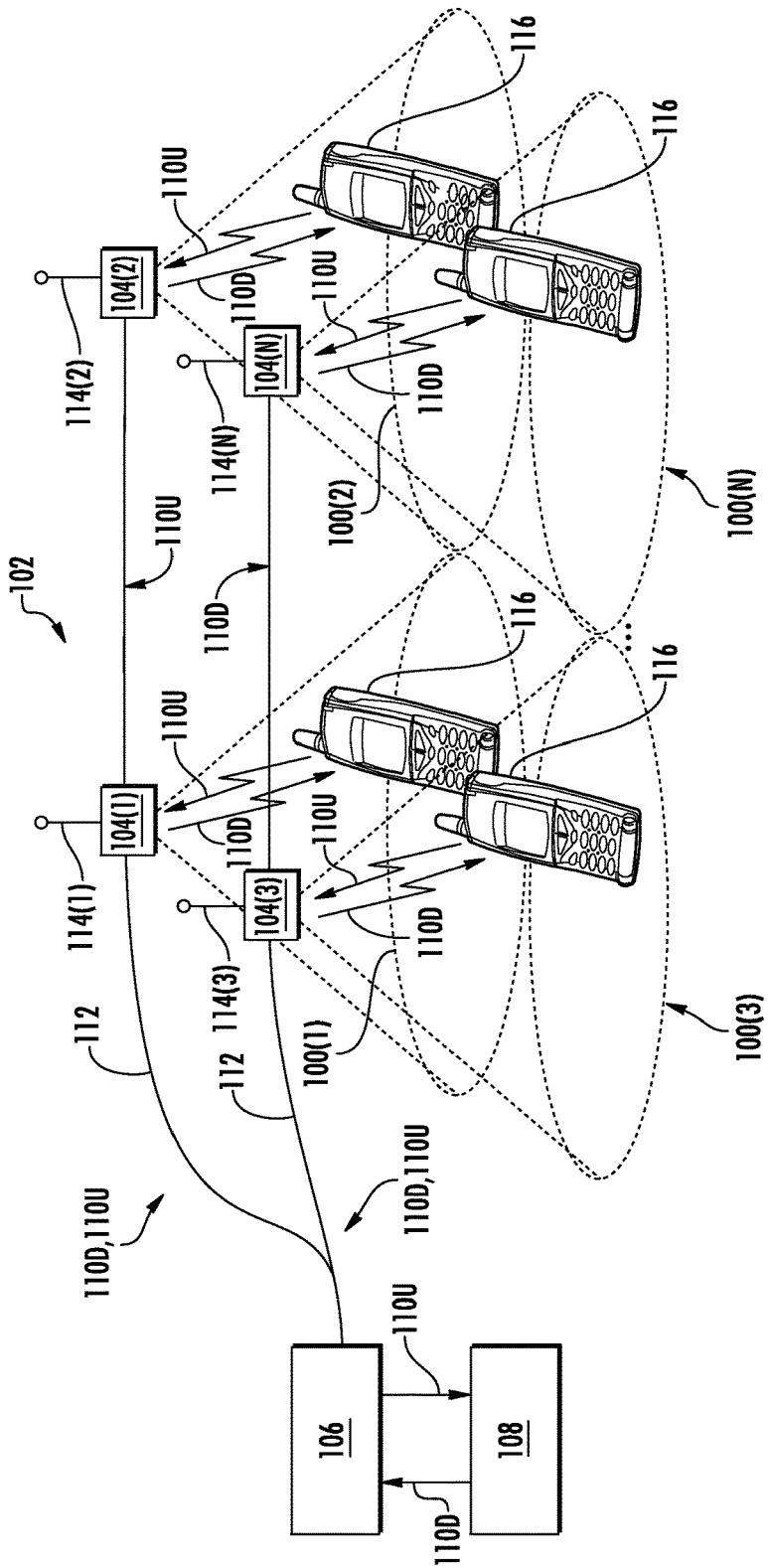
FIG. 1 is a schematic diagram of an exemplary wireless distribution system (WDS), which may be a distributed antenna system (DAS) for example.

The WDS 300 of FIG. 3 configured to support multi-source same-cell operation with dynamic source adaptation can bring significant performance improvement over the DAS 102 of FIG. 1 and the wireless communications system 208 of FIG. 2B. The configuration and results of system simulations are discussed next with reference to FIGS. 6A-6C.

Figure 6A:
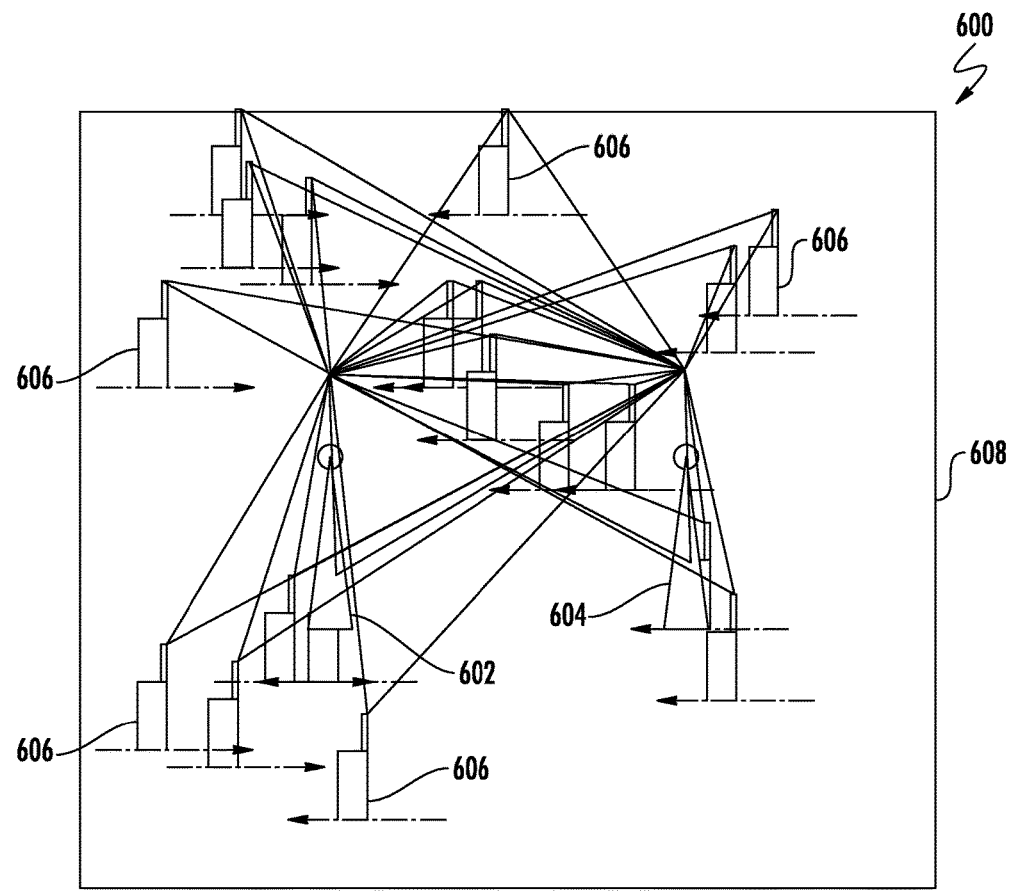
FIGS. 6A-6C are exemplary simulation configuration and results illustrating throughput improvements of the WDS of FIG. 3 under various simulation scenarios.

FIG. 6A is a schematic diagram of an exemplary network layout 600 for simulating the WDS 300 of FIG. 3 configured to support multi-source same-cell operation with dynamic source adaptation. Two remote units 602, 604 are configured to serve twenty client devices 606 in a coverage area 608. The remote units 602, 604 are each configured to be served by a respective signal source. The client devices 606 are randomly dropped into the coverage area 608. The remote units 602, 604 are coordinated via a base station to reduce inter-remote unit RF interference. The simulation is performed based on long-term evolution (LTE) specifications, with detailed configuration parameters summarized in Table 1 below.

TABLE 1

| Parameters | Remarks |
| --- | --- |
| Cellular Layout | 50 × 40 square meter (m²) coverage area (608), with two remote units (602, 604) |
| Base Station Antenna | 1 Transmit antenna with 5 dB antenna gain |
| Carrier Frequency | Center frequency = 2 GHz |
| Channel Model | Winner Indoor Office |
| Number of Client Devices | 20 |
| Client Device Speed of Interest | 3 kilometers per hour (km/h) |
| Total Base Station Transmit Power | 17 dBm, 20 MHz carrier |
| Thermal Density Power | −174 dBm |
| Noise Figure | 9 dB |
| Scheduling Algorithm | Proportionally Fair (PF) scheduling |
| CoMP Algorithm | Zero Forcing (ZF) |
| Channel Estimation | Ideal |

Figure 6B:
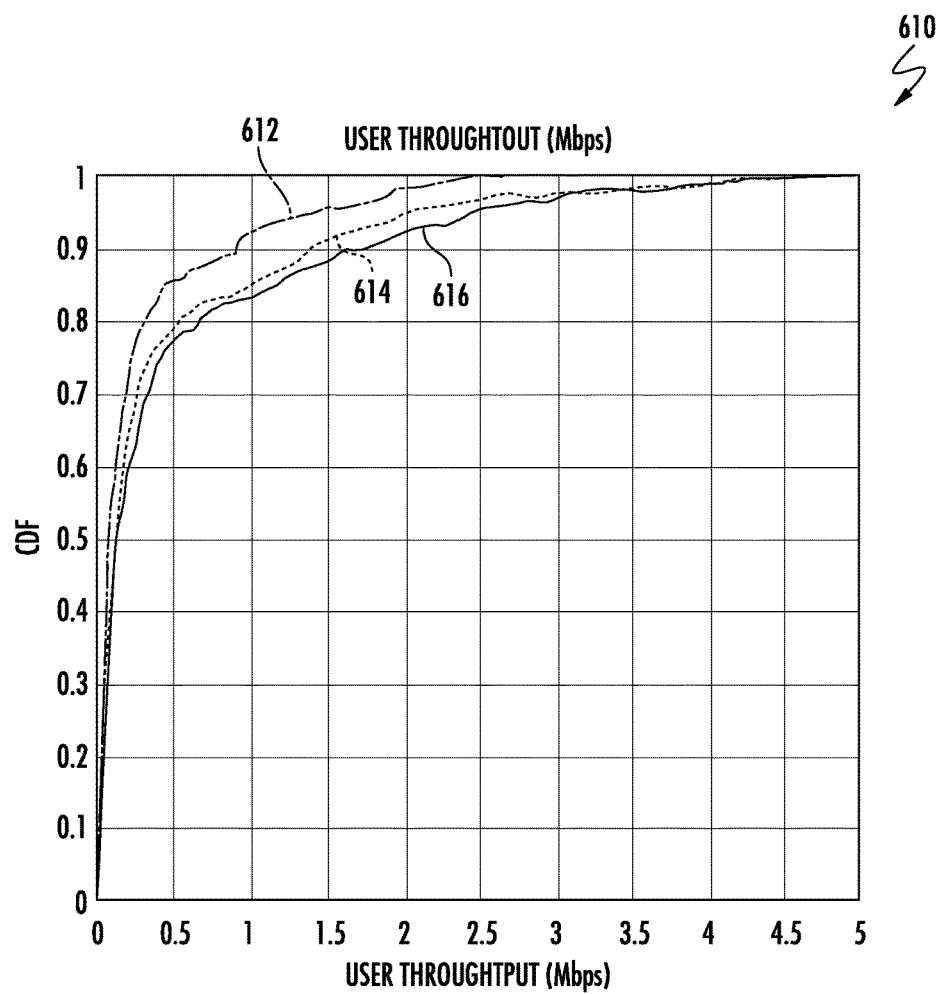

FIG. 6B is a graph 610 providing an exemplary illustration of throughput cumulative distribution function (CDF) comparison between the DAS 102 of FIG. 1 and the WDS 300 of FIG. 3. The graph 610 includes a first curve 612, a second curve 614, and a third curve 616 that represent a first throughput CDF of the DAS 102, a second throughput CDF of the WDS 300 without CoMP being enabled, and a third throughput CDF of the WDS 300 with CoMP enabled. As illustrated by the first curve 612 and the second curve 614, the WDS 300, which includes two signal sources, has approximately 50% average throughput improvement over the DAS 102 that includes only one signal source. Further, as illustrated by the second curve 614 and the third curve 616, it is possible to achieve an additional 30% average throughput improvement when CoMP is enabled in the WDS 300. Understandably, the additional average throughput improvement is a result of better RF spectrum reuse and coherent combining performed by the client devices near the coverage boundary of the remote units 602, 604.

A second simulation performed based on the WDS 300 as shown in FIG. 5A proves that it is possible to achieve further average throughput improvement with dynamic source adaption. The detailed configuration parameters of the second simulation are summarized in Table 2 below.

TABLE 2

| Parameters | Remarks |
| --- | --- |
| Cellular Layout | 50 × 50 square meter (m²) coverage area, with four remote units (304(1)-304(4)) |
| Base Station Antenna | 1 Transmit antenna with 5 dB antenna gain |
| Carrier Frequency | Center frequency = 2 GHz |
| Channel Model | Winner Indoor Office |
| Number of Client Devices | 40 |
| Client Device Speed of Interest | 3 kilometers per hour (km/h) |
| Total Base Station Transmit Power | 17 dBm, 20 MHz carrier |
| Thermal Density Power | −174 dBm |
| Noise Figure | 9 dB |
| Scheduling Algorithm | Proportionally Fair (PF) scheduling |
| CoMP Algorithm | Zero Forcing (ZF) |
| Channel Estimation | Precise |

Figure 6C:
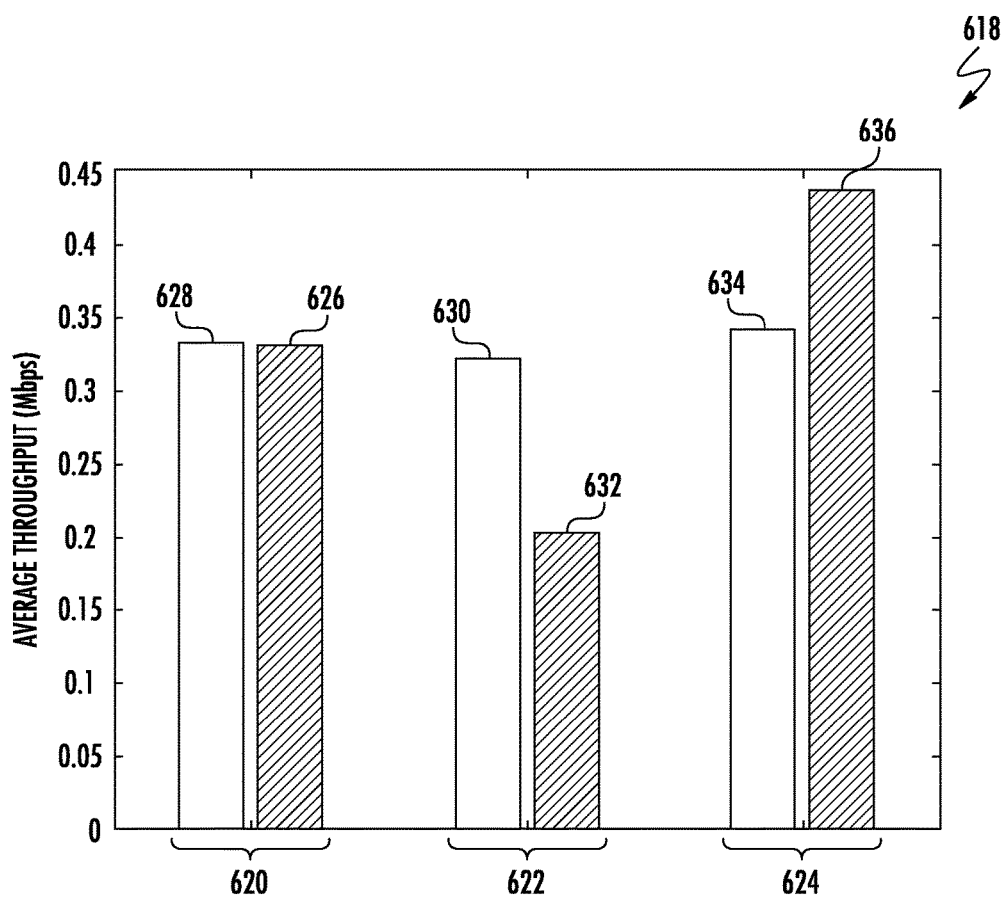

FIG. 6C is a graph 618 providing exemplary illustration of throughput CDF comparison between the WDS 300 of FIG. 3 without dynamic source adaptation and with dynamic source adaptation. Common elements between FIGS. 3 and 6C are shown therein with common element numbers and will not be re-described herein.

The graph 618 includes a first bar graph 620, a second bar graph 622, and a third bar graph 624. The first bar graph 620 shows that a total capacity of the remote units 304(1)-304(4) without dynamic source adaptation (as illustrated by bar 626) and with dynamic source adaptation (as illustrated by bar 628) remains unchanged. The second bar graph 622 shows that the remote unit 304(1) has increased capacity with dynamic source adaptation (as illustrated by bar 630) than without dynamic source adaptation (as illustrated by bar 632). This is because, with dynamic source adaptation, the defined source capacity of the selected signal source is provided exclusively to the remote unit 304(1) in the selected coverage cell 318 as a result of dynamic source adaptation. The third bar graph 624 shows that the remote units 304(2)-304(4) have decreased total capacity with dynamic source adaptation (as illustrated by bar 634) than without dynamic source adaptation (as illustrated by bar 636). This is because, with dynamic source adaptation, the defined source capacity of the second selected signal source is shared by the remote units 304(2)-304(4) in the second selected coverage cells 320 as a result of dynamic source adaptation.

Figure 7:
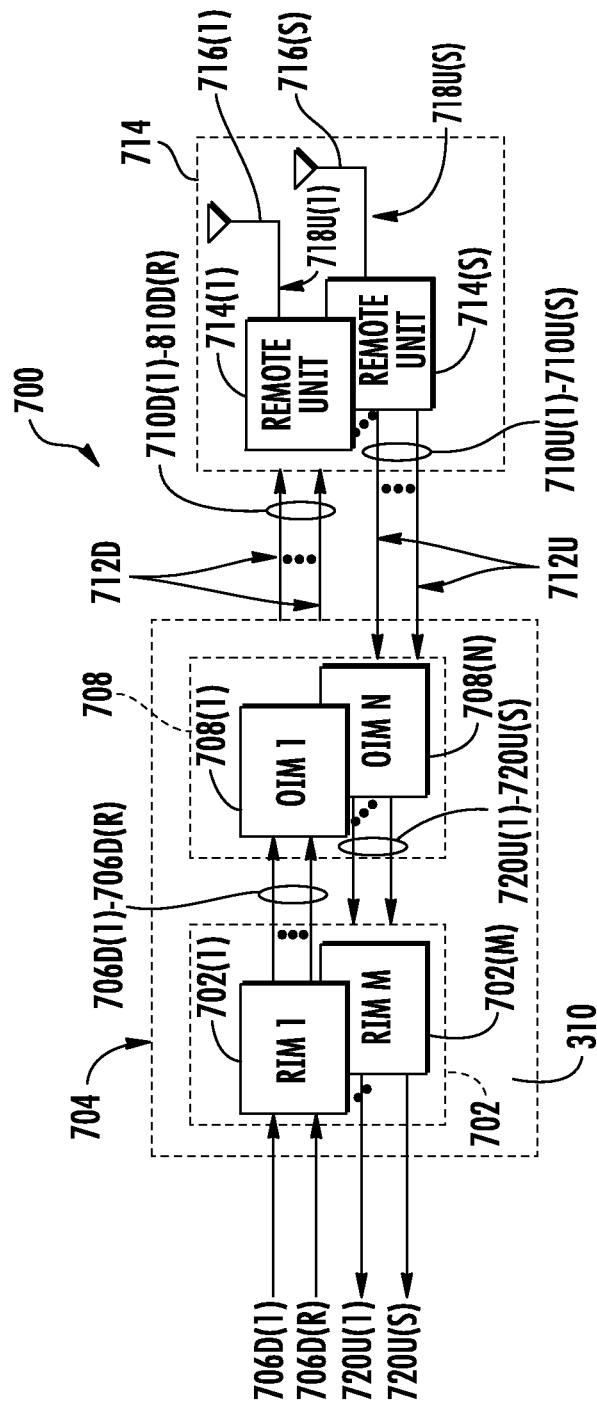
FIG. 7 is a schematic diagram of an exemplary WDS provided in the form of an optical fiber-based WDS that can include a signal distribution circuit in the WDS of FIG. 3 for supporting multi-source same-cell operation with dynamic source adaptation.

FIG. 7 is a schematic diagram of an exemplary WDS 700 provided in the form of an optical fiber-based WDS that can include the signal distribution circuit 310 of FIG. 3 for supporting multi-source same-cell operation with dynamic source adaptation. The WDS 700 includes an optical fiber for distributing communications services for multiple frequency bands. The WDS 700 in this example is comprised of three (3) main components. A plurality of radio interfaces provided in the form of radio interface modules (RIMs) 702(1)-702(M) are provided in a central unit 704, which may be configured to include the signal distribution circuit 310, to receive and process a plurality of downlink communications signals 706D(1)-706D(R) prior to optical conversion into downlink optical fiber-based communications signals. The downlink communications signals 706D(1)-706D(R), which can include the downlink communications signal 308D of FIG. 3, may be received from a base station (e.g., the signal sources 312(1)-312(K)) as an example. The RIMs 702(1)-702(M) provide both downlink and uplink interfaces for signal processing. The notations "1-R" and "1-M" indicate that any number of the referenced component, 1-R and 1-M, respectively, may be provided. The central unit 704 is configured to accept the RIMs 702(1)-702(M) as modular components that can easily be installed and removed or replaced in the central unit 704. In one example, the central unit 704 is configured to support up to twelve (12) RIMs 702(1)-702(12). Each of the RIMs 702(1)-702(M) can be designed to support a particular type of radio source or range of radio sources (i.e., frequencies) to provide flexibility in configuring the central unit 704 and the WDS 700 to support the desired radio sources.

For example, one RIM 702 may be configured to support the Personalized Communications System (PCS) radio band. Another RIM 702 may be configured to support the 800 megahertz (MHz) radio band. In this example, by inclusion of the RIMs 702(1)-702(M), the central unit 704 could be configured to support and distribute communications signals on both PCS and Long-Term Evolution (LTE) 700 radio bands, as an example. The RIMs 702(1)-702(M) may be provided in the central unit 704 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 702(1)-702(M) may also be provided in the central unit 704 that support any wireless technologies desired, including, but not limited to, Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the central unit 704 that support any frequencies desired, including, but not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the downlink communications signals 706D(1)-706D(R) are provided to a plurality of optical interfaces provided in the form of optical interface modules (OIMs) 708(1)-708(N) in this embodiment to convert the downlink communications signals 706D(1)-706D(R) into a plurality of downlink optical fiber-based communications signals 710D(1)-710D(R). Accordingly, electrical-to-optical (E/O) converters also convert the downlink communications signal 308D into the downlink optical fiber-based communications signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and E/O converters, as will be described in more detail below. The OIMs 708(1)-708(N) support the radio bands that can be provided by the RIMs 702(1)-702(M), including the examples previously described above.

The OIMs 708(1)-708(N) each include E/O converters to convert the downlink communications signals 706D(1)-706D(R) into the downlink optical fiber-based communications signals 710D(1)-710D(R). The downlink optical fiber-based communications signals 710D(1)-710D(R) are communicated over a downlink optical fiber-based communications medium 712D to a plurality of remote units 714(1)-714(S). The notation "1-S" indicates that any number of the referenced component 1-S may be provided. Remote unit O/E converters provided in the remote units 714(1)-714(S) convert the downlink optical fiber-based communications signals 710D(1)-710D(R) back into the downlink communications signals 706D(1)-706D(R), such as the downlink communications signal 308D, which are the converted into a plurality of downlink RF communications signals and provided to antennas 716(1)-716(S) in the remote units 714(1)-714(S) to client devices in the reception range of the antennas 716(1)-716(S).

The remote units 714(1)-714(S) receive a plurality of uplink RF communications signals from the client devices through the antennas 716(1)-716(S), which can include the uplink communications signal 308U of FIG. 3. The remote units 714(1)-714(S) convert the uplink RF communications signals into a plurality of uplink communications signals 718U(1)-718U(S). Remote unit E/O converters are also provided in the remote units 714(1)-714(S) to convert the uplink communications signals 718U(1)-718U(S) into a plurality of uplink optical fiber-based communications signals 710U(1)-710U(S). Accordingly, the remote unit E/O converters also convert the uplink communications signal 308U into the uplink optical fiber-based communications signals 710U(1)-710U(S). The remote units 714(1)-714(S) communicate the uplink optical fiber-based communications signals 710U(1)-710U(S) over an uplink optical fiber-based communications medium 712U to the OIMs 708(1)-708(N) in the central unit 704. The OIMs 708(1)-708(N) include O/E converters that convert the received uplink optical fiber-based communications signals 710U(1)-710U(S) into a plurality of uplink communications signals 720U(1)-720U(S), such as the uplink communications signal 308U, which are processed by the RIMs 702(1)-702(M) and provided as the uplink communications signals 720U(1)-720U(S). The central unit 704 may provide the uplink communications signals 720U(1)-720U(S) to a base station or other communications system.

Note that the downlink optical fiber-based communications medium 712D and the uplink optical fiber-based communications medium 712U connected to each of the remote units 714(1)-714(S) may be a common optical fiber-based communications medium, wherein for example, wave division multiplexing (WDM) is employed to provide the downlink optical fiber-based communications signals 710D(1)-710D(R) and the uplink optical fiber-based communications signals 710U(1)-710U(S) on the same optical fiber-based communications medium.

Figure 8:
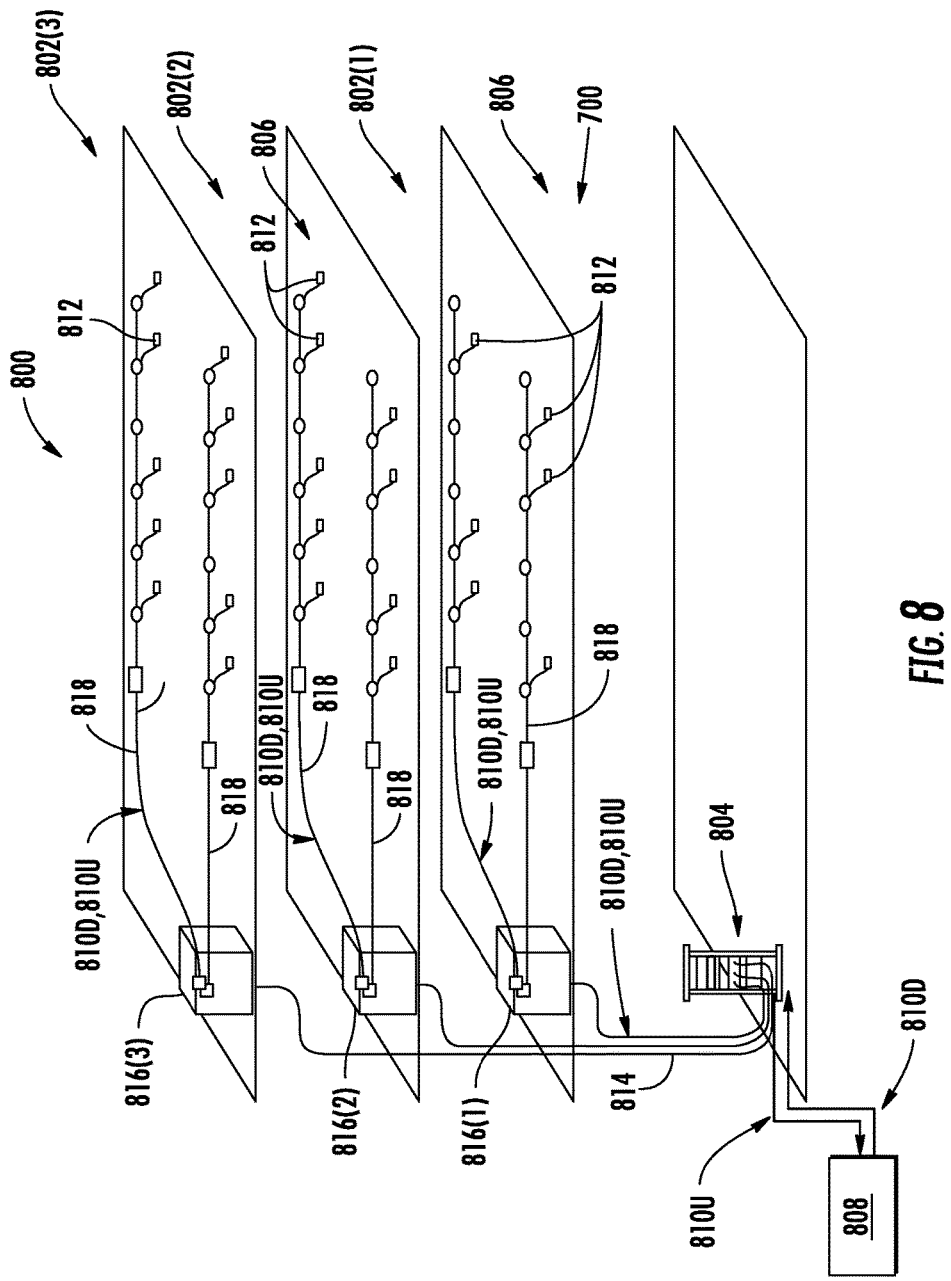
FIG. 8 is a partial schematic cut-away diagram of an exemplary building infrastructure in which a WDS, such as the WDS of FIG. 7, can include the signal distribution circuit in the WDS of FIG. 3 for supporting multi-source same-cell operation with dynamic source adaptation.

The WDS 700 of FIG. 7 may be provided in an indoor environment, as illustrated in FIG. 8. FIG. 8 is a partial schematic cut-away diagram of an exemplary building infrastructure 800 in which a WDS, such as the WDS 700 of FIG. 7, can include the signal distribution circuit 310 of FIG. 3 for supporting multi-source same-cell operation with dynamic source adaptation. The building infrastructure 800 in this embodiment includes a first (ground) floor 802(1), a second floor 802(2), and a third floor 802(3). The floors 802(1)-802(3) are serviced by a central unit 804 to provide antenna coverage cells 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
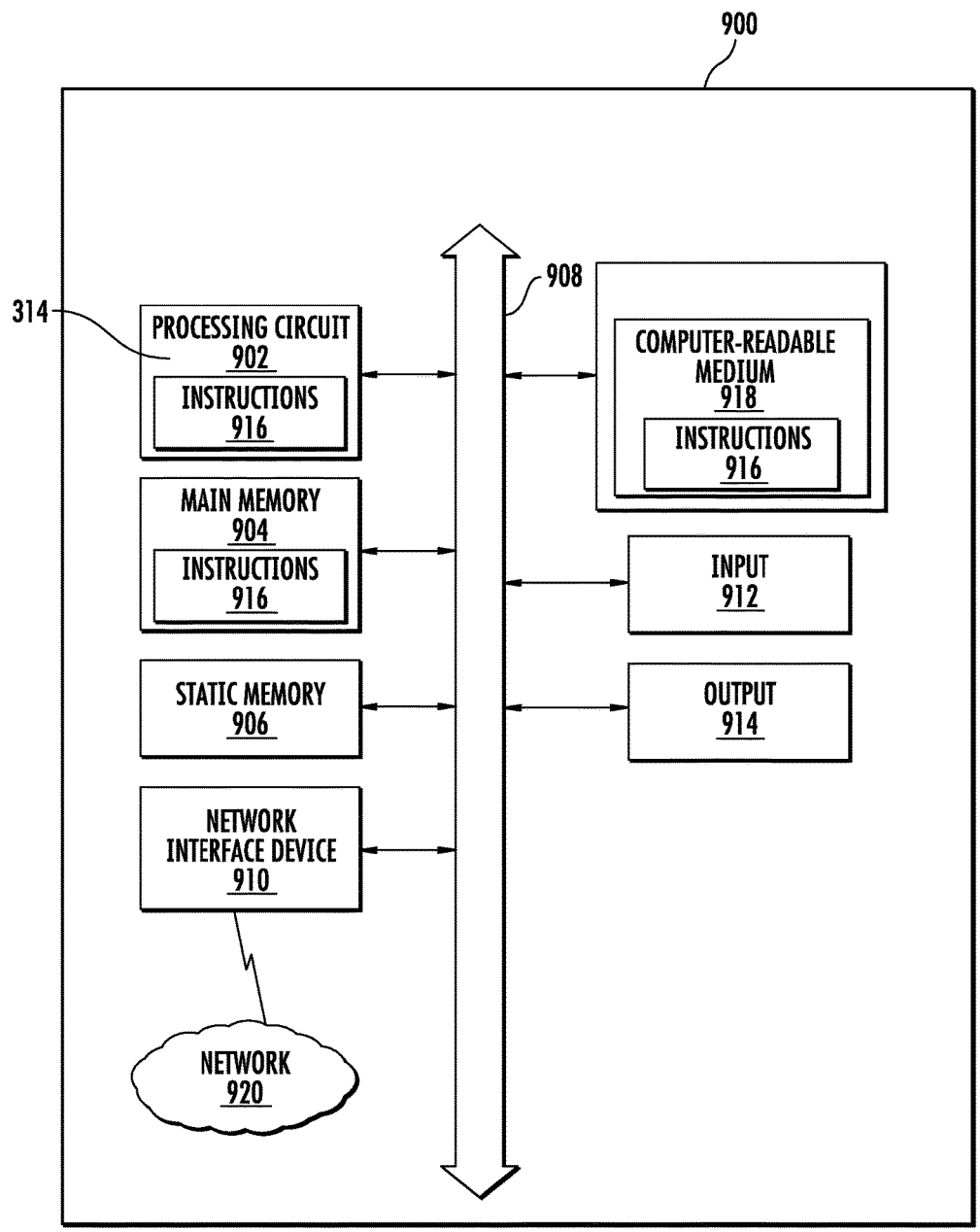
FIG. 9 is a schematic diagram representation of additional detail illustrating an exemplary computer system that could be employed in a controller, including a signal distribution circuit in the WDS of FIG. 3, for supporting multi-source same-cell operation with dynamic source adaptation.

FIG. 9 is a schematic diagram representation of additional detail illustrating an exemplary computer system 900 that could be employed in a controller including the signal distribution circuit 310 of FIG. 3 for supporting multi-source same-cell operation with dynamic source adaptation. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to predict frequency interference to avoid or reduce interference in a multi-frequency DAS. The computer system 900 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing circuit or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or the static memory 906 directly or via some other connectivity means. The processor 902 may be a controller, and the main memory 904 or the static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein. In a non-limiting example, the processor 902 can be configured to function as the control circuit 314 in the signal distribution circuit 310.

The computer system 900 may further include a network interface device 910. The computer system 900 also may or may not include an input 912, configured to receive input and selections to be communicated to the computer system 900 when executing instructions. The computer system 900 also may or may not include an output 914, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting a computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
a plurality of signal sources associated with an identical cell identification, wherein each of the plurality of signal sources has a defined source capacity and configured to distribute a downlink communications signal comprising the identical cell identification, wherein the WDS does not include a macro coverage cell associated with the identical cell identification;

a plurality of remote units each configured to distribute the downlink communications signal to one or more client devices in a respective coverage cell among a plurality of coverage cells associated with the identical cell identification in the WDS; and a signal distribution circuit communicatively coupled to the plurality of signal sources, the signal distribution circuit configured to:

receive the downlink communications signal from each of the plurality of signal sources;

determine a selected coverage cell among the plurality of coverage cells having a client device load higher than a predefined load threshold;

determine a selected signal source among the plurality of signal sources for providing the respective defined source capacity to the selected coverage cell; and distribute the downlink communications signal received from the selected signal source exclusively to the selected coverage cell.

2. The WDS of claim 1, wherein the signal distribution circuit is further configured to:

determine one or more second selected coverage cells among the plurality of coverage cells having the client device load lower than the predefined load threshold;

determine a second selected signal source among the plurality of signal sources for sharing the respective defined source capacity between the one or more second selected coverage cells; and distribute the downlink communications signal received from the second selected signal source to the one or more second selected coverage cells.

3. The WDS of claim 2, wherein the one or more second selected coverage cells overlap at least partially with the selected coverage cell.

4. The WDS of claim 2, wherein the defined source capacity of the selected signal source equals the defined source capacity of the second selected signal source.

5. The WDS of claim 2, wherein the defined source capacity of the selected signal source is greater than the defined source capacity of the second selected signal source.

6. The WDS of claim 2, wherein the defined source capacity of the selected signal source is less than the defined source capacity of the second selected signal source.

7. The WDS of claim 2, wherein the signal distribution circuit is further configured to:

receive a plurality of client device load reports from the plurality of remote units; and determine the client device load in each of the plurality of coverage cells based on the plurality of client device load reports.

8. The WDS of claim 2, wherein the signal distribution circuit is further configured to:

receive an uplink communications signal from the selected coverage cell;

provide the uplink communications signal received from the selected coverage cell exclusively to the selected signal source among the plurality of signal sources;

receive the uplink communications signal from the one or more second selected coverage cells; and provide the uplink communications signal received from the one or more second selected coverage cells to the second selected signal source.

9. The WDS of claim 8, wherein each of the plurality of remote units is further configured to:

distribute the downlink communications signal in an identical downlink radio frequency (RF) spectrum; and receive the uplink communications signal in an identical uplink RF spectrum.

10. The WDS of claim 8, wherein the signal distribution circuit comprises:

a control circuit configured to:

receive the downlink communications signal from each of the plurality of signal sources;

determine the selected coverage cell among the plurality of coverage cells having the client device load higher than the predefined load threshold;

determine the selected signal source among the plurality of signal sources for providing the respective defined source capacity to the selected coverage cell;

determine the one or more second selected coverage cells among the plurality of coverage cells having the client device load lower than the predefined load threshold; and determine the second selected signal source among the plurality of signal sources for sharing the respective defined source capacity between the one or more second selected coverage cells; and a signal distributor/combiner circuit configured to:

distribute the downlink communications signal received from the selected signal source exclusively to the selected coverage cell; and distribute the downlink communications signal received from the second selected signal source to the one or more second selected coverage cells.

11. The WDS of claim 10, wherein the signal distributor/combiner circuit is further configured to:

provide the uplink communications signal received from the selected coverage cell exclusively to the selected signal source among the plurality of signal sources; and provide the uplink communications signal received from the one or more second selected coverage cells to the second selected signal source.

12. The WDS of claim 8, further comprising a central unit coupled to the plurality of remote units via a plurality of communications mediums, wherein the central unit comprises the signal distribution circuit.

13. The WDS of claim 12, wherein:

the plurality of communications mediums comprises a plurality of optical fiber-based communications mediums;

the central unit comprises electrical-to-optical (E/O) converters configured to generate a plurality of downlink optical fiber-based communications signals based on the downlink communications signal for distribution to the plurality of remote units;

the plurality of remote units comprises:

remote unit optical-to-electrical (O/E) converters configured to convert the plurality of downlink optical fiber-based communications signals into the downlink communications signal; and remote unit E/O converters configured to generate a plurality of uplink optical fiber-based communications signals based on the uplink communications signal for distribution to the central unit; and the central unit further comprises O/E converters configured to convert the plurality of uplink optical fiber-based communications signals into the uplink communications signal.

14. A method for supporting multi-source same-cell operation with dynamic source adaptation in a wireless distribution system (WDS), comprising:

providing a plurality of remote units each configured to distribute a downlink communications signal comprising an identical cell identification to one or more client devices in a respective coverage cell among a plurality of coverage cells in the WDS, wherein the WDS does not include a macro coverage cell associated with the identical cell identification;

communicatively coupling a signal distribution circuit to a plurality of signal sources each having a defined source capacity and associated with the identical cell identification, the plurality of signal sources configured to distribute the downlink communications signal to the WDS;

receiving the downlink communications signal from each of the plurality of signal sources;

determining a selected coverage cell among the plurality of coverage cells having a client device load higher than a predefined load threshold;

determining a selected signal source among the plurality of signal sources for providing the respective defined source capacity to the selected coverage cell; and distributing the downlink communications signal received from the selected signal source exclusively to the selected coverage cell.

15. The method of claim 14, further comprising:
determining one or more second selected coverage cells among the plurality of coverage cells having the client device load lower than the predefined load threshold;

determining a second selected signal source among the plurality of signal sources for sharing the respective defined source capacity between the one or more second selected coverage cells; and distributing the downlink communications signal received from the second selected signal source to the one or more second selected coverage cells.

16. The method of claim 15, further comprising:
receiving a plurality of client device load reports from the plurality of remote units; and determining the client device load in each of the plurality of coverage cells based on the plurality of client device load reports.

17. The method of claim 15, further comprising:
receiving an uplink communications signal from the selected coverage cell;

providing the uplink communications signal received from the selected coverage cell exclusively to the selected signal source among the plurality of signal sources;

receiving the uplink communications signal from the one or more second selected coverage cells; and providing the uplink communications signal received from the one or more second selected coverage cells to the second selected signal source.

18. The method of claim 17, further comprising:
distributing the downlink communications signal in an identical downlink radio frequency (RF) spectrum; and receiving the uplink communications signal in an identical uplink RF spectrum.

19. A signal distribution circuit, comprising:
a control circuit configured to:
receive a downlink communications signal from each of a plurality of signal sources communicatively coupled to the signal distribution circuit, wherein each of the plurality of signal sources has a defined source capacity and associated with an identical cell identification, the plurality of signal sources configured to distribute the downlink communications signal to a wireless distribution system (WDS), wherein the WDS does not include a macro coverage cell associated with the identical cell identification;

determine a selected coverage cell among a plurality of coverage cells respectively defined by a plurality of remote units, wherein the selected coverage cell has a client device load higher than a predefined load threshold; and determine a selected signal source among the plurality of signal sources for providing the respective defined source capacity to the selected coverage cell; and a signal distributor/combiner circuit configured to distribute the downlink communications signal received from the selected signal source exclusively to the selected coverage cell.

20. The signal distribution circuit of claim 19, wherein:
the control circuit is further configured to:
determine one or more second selected coverage cells among the plurality of coverage cells having the client device load lower than the predefined load threshold; and determine a second selected signal source among the plurality of signal sources for sharing the respective defined source capacity between the one or more second selected coverage cells; and the signal distributor/combiner circuit is further configured to distribute the downlink communications signal received from the second selected signal source to the one or more second selected coverage cells.

21. The signal distribution circuit of claim 20, further configured to:
receive a plurality of client device load reports from the plurality of remote units; and determine the client device load in each of the plurality of coverage cells based on the plurality of client device load reports.

22. The signal distribution circuit of claim 20, further configured to:
receive an uplink communications signal from the selected coverage cell;

provide the uplink communications signal received from the selected coverage cell exclusively to the selected signal source among the plurality of signal sources;

receive the uplink communications signal from the one or more second selected coverage cells; and provide the uplink communications signal received from the one or more second selected coverage cells to the second selected signal source.

23. The signal distribution circuit of claim 22, wherein the signal distributor/combiner circuit is further configured to:
provide the uplink communications signal received from the selected coverage cell exclusively to the selected signal source among the plurality of signal sources; and provide the uplink communications signal received from the one or more second selected coverage cells to the second selected signal source.

* * * * *